US 8,346,531 B2

(12) United States Patent
Das et al.

(10) Patent No.: US 8,346,531 B2
(45) Date of Patent: Jan. 1, 2013

(54) HANDLING MUTEX LOCKS IN A DYNAMIC BINARY TRANSLATION ACROSS HETEROGENEOUS COMPUTER SYSTEMS

(75) Inventors: Abhinav Das, Sunnyvale, CA (US); Jiwei Lu, Pleasanton, CA (US); William Y. Chen, Los Altos, CA (US); Chandramouli Banerjee, Fremont, CA (US)

(73) Assignee: Oracle America, Inc., Redwood City, CA (US)

( * ) Notice: Subject to any disclaimer, the term of this patent is extended or adjusted under 35 U.S.C. 154(b) by 1092 days.

(21) Appl. No.: 12/264,944

(22) Filed: Nov. 5, 2008

(65) Prior Publication Data

US 2010/0114555 A1 May 6, 2010

(51) Int. Cl.
*G06F 9/455* (2006.01)
(52) U.S. Cl. ............. 703/23; 703/27; 717/136; 707/760
(58) Field of Classification Search .................. 703/23, 703/27; 717/136; 707/760
See application file for complete search history.

(56) References Cited

U.S. PATENT DOCUMENTS

| 5,560,013 | A | 9/1996 | Scalzi et al. |
| 6,631,514 | B1 | 10/2003 | Le |
| 6,993,754 | B2* | 1/2006 | Freudenberger et al. ..... 717/153 |
| 7,353,163 | B2 | 4/2008 | Rawsthorne et al. |
| 2002/0046305 | A1* | 4/2002 | Babaian et al. ................... 710/5 |
| 2003/0159134 | A1 | 8/2003 | Souloglou et al. |
| 2004/0103110 | A1* | 5/2004 | Goode et al. .................. 707/101 |
| 2004/0205733 | A1 | 10/2004 | Souloglou et al. |
| 2004/0210880 | A1 | 10/2004 | Souloglou et al. |
| 2005/0050257 | A1* | 3/2005 | Shakula ........................... 711/1 |

* cited by examiner

*Primary Examiner* — Eunhee Kim
(74) *Attorney, Agent, or Firm* — Brooks Kushman P.C.

(57) ABSTRACT

A method for executing non-native binaries on a host computer architecture comprises receiving a guest executable binary encoded on a computer readable medium. The guest executable binary is executable on a first computer architecture. Moreover, the guest executable binary includes a mutex lock encoded instructions for implementing a mutex lock. The guest executable binary is then executed on the host computer architecture by first translating the guest executable binary to a translated executable binary. The encoded instructions for implementing a mutex lock are translated by mapping the mutex lock to an instance of a compound mutex lock data structure. A computer system implementing methods for executing non-native binaries on a host computer architecture is also provided.

20 Claims, 5 Drawing Sheets

Solaris 10

```
typedef struct mutex {
    struct {
        uint16_t flag1;
        uint8_t flag2;
        uint8_t ceiling;
        union {
            uint16_t bcptype;
            struct {
                uint8_t count_type1;
                uint8_t count_type2;
            }mtype_rcount;
        }mbcp_type_un;
        uint16_t magic;
    }flags;
    union {
        struct {
            uint8_t pad[8];
        }lock64;
        struct {
          uint32_t ownerpid;
          uint32_t lockword;
        }lock32;
        upad64_t owner64;
    }lock;
    upad64_t data;
}mutex_t;
```

HANDLING MUTEX LOCKS IN A DYNAMIC BINARY TRANSLATION ACROSS HETEROGENEOUS COMPUTER SYSTEMS

BACKGROUND OF THE INVENTION

1. Field of the Invention

The present invention relates to a method of running non-native binaries on a host computer system.

2. Background Art

Currently, a large number of differing computer architectures are utilized both commercially and privately. Although many software applications exist for each of these platforms, there are frequent instances in which a desired program will not run on a given computer architecture. This is particularly true for custom applications developed to a specialized task. Binary translation, and in particular dynamic binary translation, are utilized to provide the capability of running non-native code on a host computer system.

Modern OS kernels such as Solaris are fully multithreaded. FIG. 1 provides a schematic illustration of the relationship between light weight processes (LWP). Each user threads 10, 12, 14 are 1-to-1 mapped to light weight process 16, 18, 20. Light weight process 16, 18, 20 are in turn 1-to-1 mapped to kernel threads 22, 24, 26 in the kernel mode. Scheduling and context switching are deployed on kernel threads 22, 24, 26. Dispatcher 28 is utilized to schedule which threads are running at any given time. For this reason, two threads simultaneously calling the same system call ("syscall") will not block each other and race condition happens only when two threads compete for the same object resources (user data, system resources, etc.).

The standard C library (libc) provides library subroutines such as mutex_lock/mutex_unlock that hide the detail of what each byte in the above data structure means from the common developers. Mutual exclusion locks are data objects that prevents multiple threads from simultaneously executing critical sections of code which access shared data. libraries, such at the standard C library shield developers from having to consider the detailed implementation of mutex locks on a given computer platform. FIG. 2 provides an illustration of the interaction of a mutex lock data structure with a library routine and the kernel. Library routine 30 accesses members of an instance of mutex lock object 32. Kernel 34 also accesses the instance of members of mutex lock object 32 via a system call (syscall).

Dynamic binary translators that are used to translate the library routines written for one platform (e.g. Sparc+Solaris) into code runnable on another platform (x86+Solaris/Linux) must determine what to do when a mutex-related syscall is encountered during execution of the translated code of these library routines. Occurrence of such syscall is probably insinuating the current thread may need to do something to block itself in sleep mode or to wake up other lightweight processes waiting for this mutex to be released, actions yet only doable in the kernel mode. The mutex_lock data structure, if in the native binary, works as a messenger through the syscall interface for the library routines to control the kernel behavior. However, since the kernel OS underneath our translator is of different platform/ISA, it's difficult to just pass the mutex lock directly to the kernel, as it may be viewed in a totally undesirable way. In fact, the common solution for quick translating other syscalls that are not as stringent on the atomicity as the mutex-related ones is to beef up the host data by duplicating/modifying the data structure given by the translated code and pass to the kernel. This is certainly not a choice for mutex-related syscalls requiring atomicity. If kernel views the data structure differently from user, there is a requirement for the translator to prepare new data object for the host syscalls and call them, all completed atomically, which is extremely hard to implement. On the other hand, without kernel help, is seems to be difficult to affect LWPs belonging to other processes.

Accordingly, there is a need for improved methods of executing non-native code on a host computer system.

SUMMARY OF THE INVENTION

The present invention solves one or more problems of the prior art by providing in at least one embodiment a method for executing non-native binaries on a host computer architecture. The method of this embodiment comprises receiving a guest executable binary encoded on a computer readable medium. The guest executable binary is executable on a first computer architecture. Moreover, the guest executable binary includes a mutex lock encoded instructions for implementing a mutex lock. The guest executable binary is then executed on the host computer architecture by first translating the guest executable binary to a translated executable binary. The encoded instructions for implementing a mutex lock are translated by mapping the mutex lock to an instance of a compound mutex lock data structure. Characteristically, the compound mutex lock data structure includes a pointer to a first mutex lock data structure and a pointer to a second mutex lock data structure. The first mutex lock data structure interacts with the encoded instructions in a manner that simulates the operation of a mutex lock on the first computer architecture. The second mutex data structure is the mutex lock data structure native to the host computer architecture. Each instruction of the executable binary is subsequently executed.

In another exemplary embodiment of the present invention, a computer system for implementing the method set forth above is provided. The computer system of this embodiment includes a computer processor operable to receive a guest executable binary encoded on a computer readable medium. The guest executable binary is executable on a first computer architecture. Moreover, the guest executable binary includes a mutex lock encoded instructions for implementing a mutex lock. The guest executable binary is then executed on the host computer architecture by first translating the guest executable binary to a translated executable binary. The encoded instructions for implementing a mutex lock are translated by mapping the mutex lock to an instance of a compound mutex lock data structure. Characteristically, the compound mutex lock data structure includes a pointer to a first mutex lock data structure and a pointer to a second mutex lock data structure. The first mutex lock data structure interacts with the encoded instructions in a manner that simulates the operation of a mutex lock on the first computer architecture. The second mutex data structure is the mutex lock data structure native to the host computer architecture. Each instruction of the executable binary is subsequently executed.

DETAILED DESCRIPTION OF THE PREFERRED EMBODIMENT(S)

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

Figure 1:
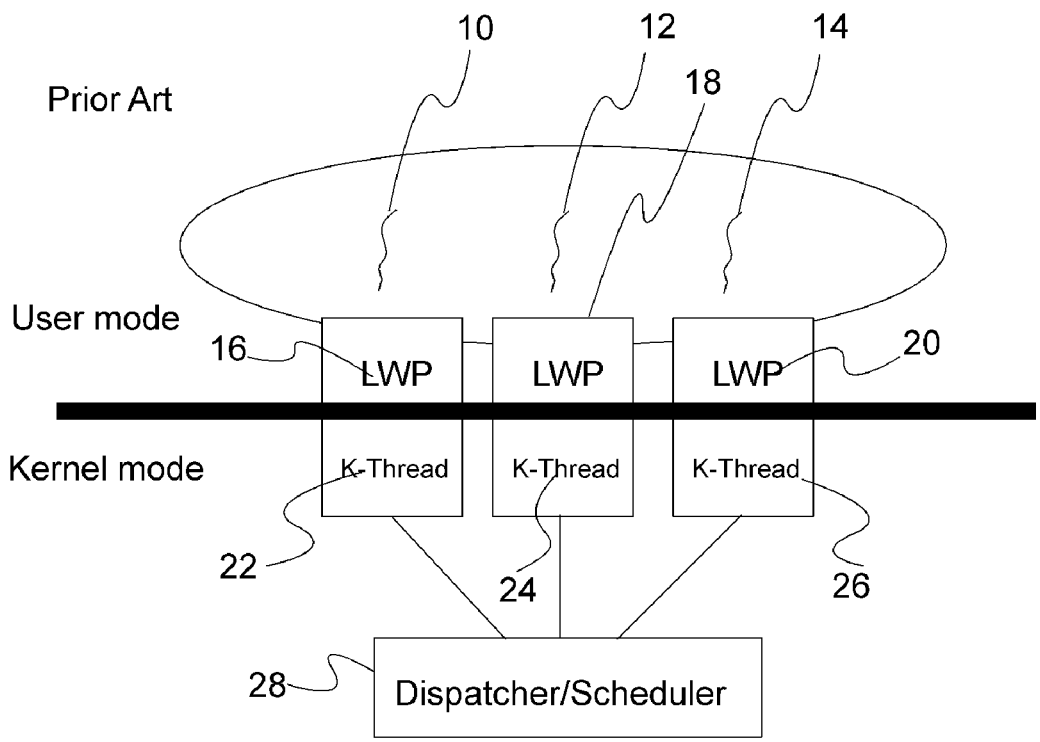
FIG. 1 is a schematic illustration of showing the relationship between light weight processes and kernel threads.
Figure 2:
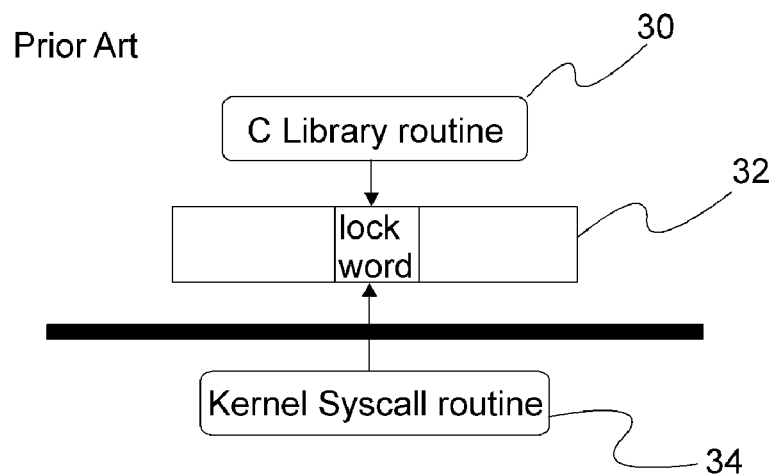
FIG. 2 is a schematic illustration demonstrating the interaction of a user process and a mutex lock data structure.
Figure 3:
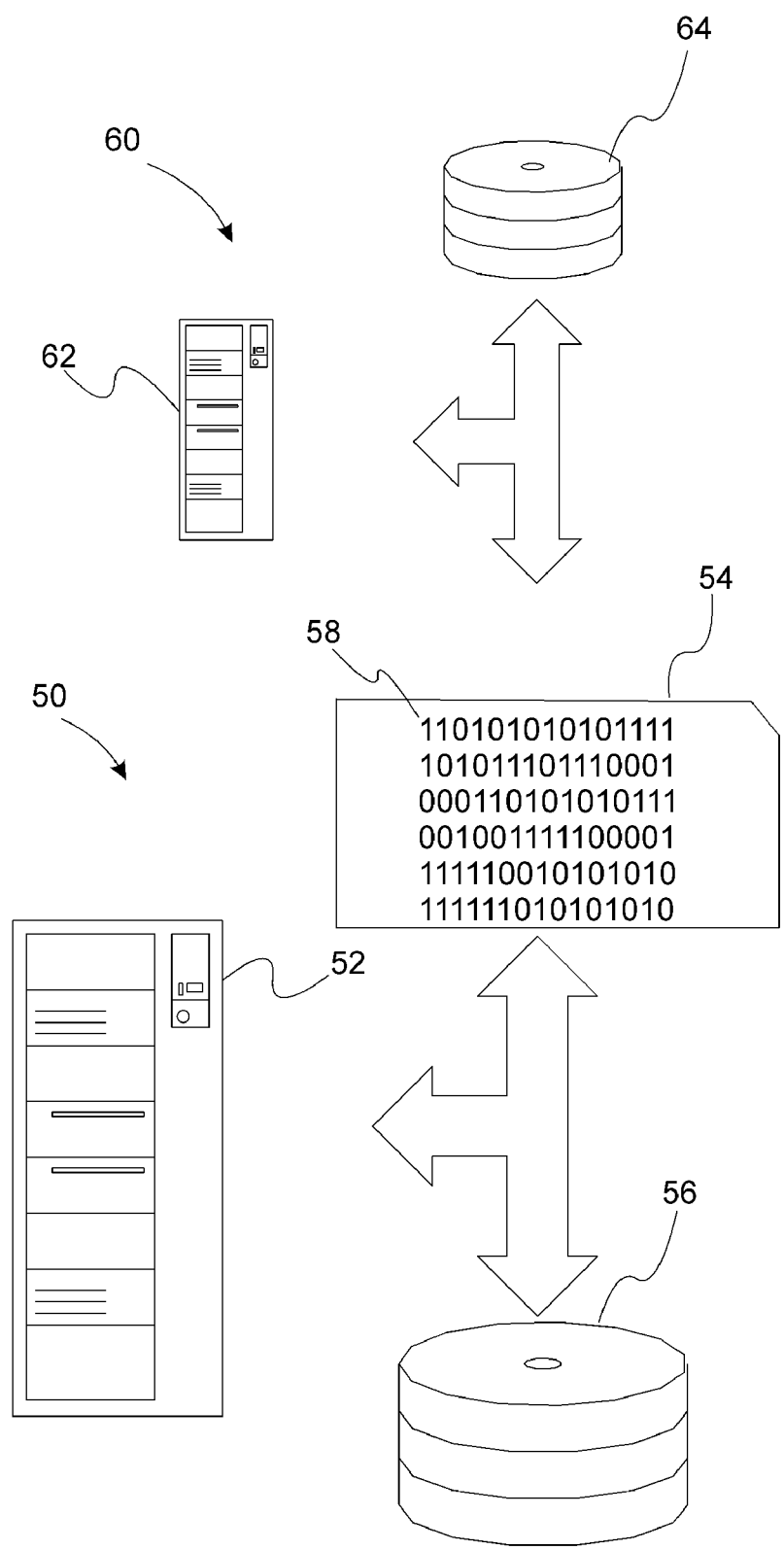
FIG. 3 is a schematic illustration of a computer architecture used to implement an exemplary embodiment of the present invention.

With reference to FIG. 3, a schematic illustration of a system implementing a method of executing a non-native executable on a host computer architecture is provided. Host computer system 50 includes host computer processor 52 which is communication with computer memory 54 and memory storage device 56. Computer memory 54 is typically random access memory. Examples of suitable memory storage devices include, but are not limited to, hard drives (includes RAID), tape drives, CDROMs, DVDs, and the like.

In a refinement of the present embodiment, host computer architecture 52 is a microprocessor-based computer system. Host computer system 50 is characterized by a host computer architecture which is defined by both the specific hardware components contained with host computer system 50, as well as the operating system running on host computer system 50. Examples of operating systems that are relevant to the present invention include, but are not limited to, Solaris, Linux, Windows, and the like. Examples of hardware architectures that are relevant to the present invention include, but are not limited to, RISC, CISC, and MIPS architectures. More specific hardware architectures are exemplified by the Sparc™ and Intel™ x86 platforms.

In accordance with exemplary embodiments of the present invention, host computer system 50 is configured to run executable binary 58. Executable binary 58 is non-native to the computer architecture of host computer system 50. The term "non-native" as used in the present application means an executable binary that the operating system cannot normally execute on host computer system 50. Typically, executable binary 58 is designed to run on computer system 60 which has a different computer architecture than computer system 50. Such differences include hardware differences (e.g., different central processing units, memory bus designs, number of computer processors, etc.). In some variations, the difference include the utilization of different operating systems. Computer system 60 includes computer processor 62 and computer storage device 64.

Figure 4A:
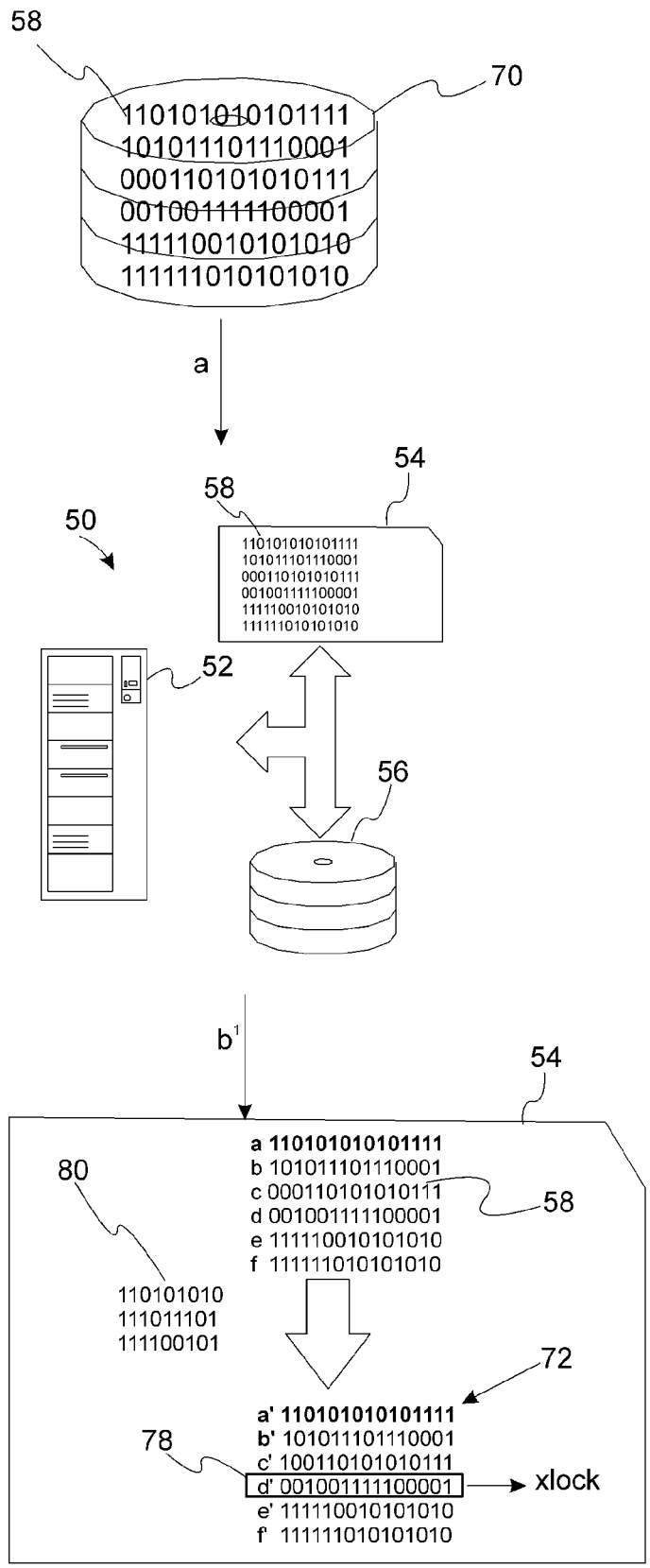
FIGS. 4A and 4B are a pictorial flowchart illustrating an exemplary method of executing a guest executable binary on a host computer architecture.
Figure 4B:
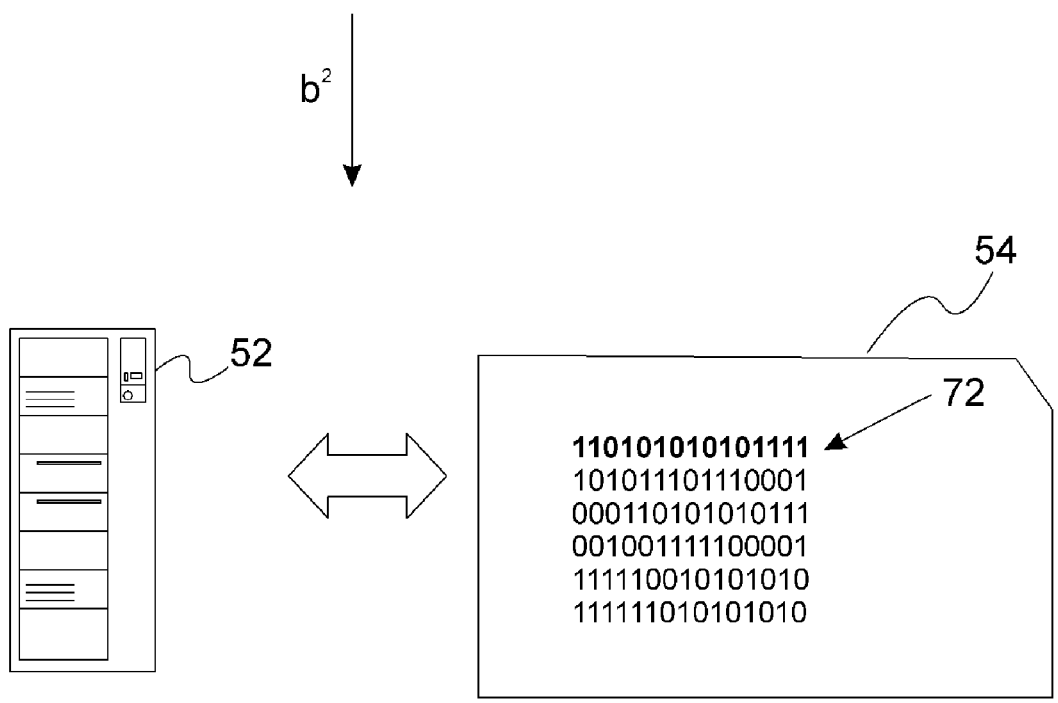

With reference to FIGS. 4A and 4B, a flow chart schematically illustrating an exemplary method of executing non-native binaries on host computer system 50 is provided. Guest executable binary 58 encoded on a computer readable medium 70 is received into computer memory 54. Guest executable binary 58 is capable of being executed on a first computer architecture which is different than host computer system 50 as set forth above. Characteristically, guest binary 58 includes encoded instructions 70 for implementing a mutex lock. In step b), guest executable binary 58 is executed on host computer system 50.

During sub-step $b^1$), guest executable binary 58 is translated into executable binary 72 which is capable of being executed on host computer system 50. Translation of guest executable binary 58 is effectuated via translation algorithm 80 which is also executing on host computer system 50. Translated executable binary 72 is capable of being executed on host computer architecture of host computer system 50. During this translation, encoded instructions 78 for implementing a mutex lock are translated by mapping the mutex lock to an instance of a compound mutex lock data structure referred to herein as xlock. The following struct provides a definition of such a data structure:

```
typedef struct xlock {
    target_mutex_t *mp;
    host_mutex_t *mt;
} xlock;
```

Figure 5:
FIG. 5 provides an example of a mutex lock object that is used on Solaris 10.

The xlock data struck includes a pointer (*mp) to a first mutex lock data structure and a pointer (*mt) to a second mutex lock data structure. The first mutex lock data structure interacts with the encoded instructions in a manner that simulates the operation of a mutex lock on the first computer architecture. In a variation, the operation of a mutex lock on the first computer architecture is simulated by emulation (e.g., full virtualization, operating system-level virtualization, and the like). The second mutex data structure is the mutex lock data structure native to the second computer architecture. In sub-step $b^2$), each instruction of the executable binary is executed. FIG. 5 provides an example of a mutex lock object that is used on Solaris 10.

Figure 6:
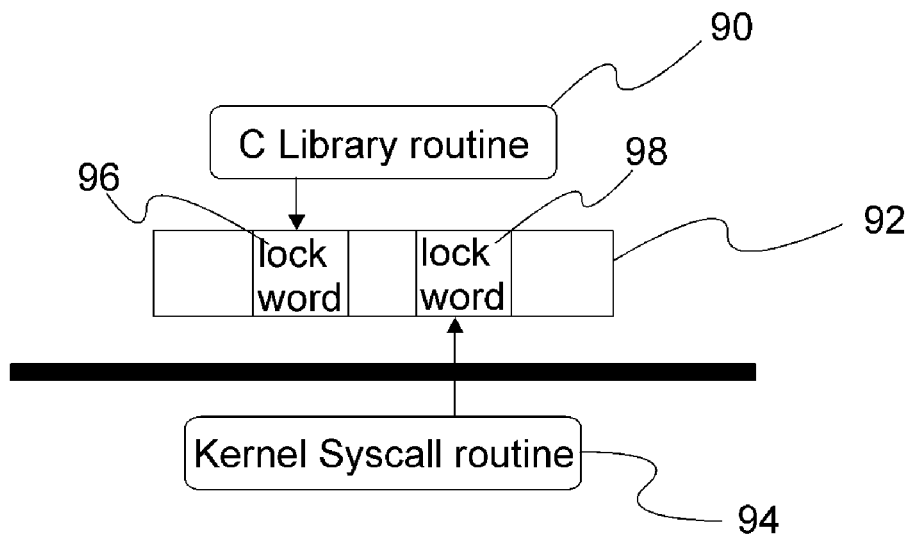
FIG. 6 is a schematic illustration showing the interaction of the x-lock data structure with a library routine and the kernel.

FIG. 6 provides an illustration of the interaction of the x-lock data structure with the translated code of a library routine and the host OS kernal. Library routine 90 accesses members of an instance of mutex lock object 92. Kernel 94 also accesses the instance of members of mutex lock members of an instance of mutex lock object 92 via a system call (syscall). From the perspective of the guest binary, mutex lock object 92 is viewed as lock data structure 96, while from the kernel it is view as lock data structure 98.

In a variation of the present embodiment, the translation and execution of guest executable binary 58 is dynamic with the encoded instructions being sequentially translated and executed. In one refinement, the dynamic translation comprises replicating or mapping the registers of the first computer architecture to the registers or memory locations in the host computer architecture. In another refinement, the dynamic translation comprises translating a predetermined small section of the guest binary. Typically, this small section is a "basic block" which starts with a first instruction at a unique entry point and ends at a last instruction at an unique exit point. In a further refinement, the last instruction of the block is a jump, call or branch instruction (conditional or unconditional). With reference to FIG. 4 to illustrate these features, instruction a is translated to instruction a' and then executed, instruction b is translated to instruction b' and then executed, instruction c is translated to instruction c' and then executed, and so on. It is also understood that one to more mapping and more to one mapping are also likely in translating the non-native binary. Methods of translating instructions that can be used in the practice of the present invention are set forth in U.S. Pat. Nos. 5,560,013, 6,631,514, and 7,353,163 and U.S. Pat. Appl. Nos. 20020046305, 2003/0159134, 2004/0205733, and 2004/0210880. The entire disclosures of these patents and patent application are hereby incorporated by reference.

In a variation of the present embodiment, mutex-related kernel syscalls are emulated. Inside the emulation routines, any host computer architecture's atomic operation (such as CMPXCHG on Intel x86), if used, applies directly to xlock→mp to mimic the behavior of the guest OS system. In other words, the translated code and emulation routines view mp as pointer to the mutex object, as if they are running on the guest computer system. However, if kernel service is unavoidable, for instance, to notify other LWPs, either from the same process or from other process, xlock→mt is used with a call to the host kernel syscalls to complete the job.

In another variation of the present invention, the translated instructions of translated binary 72 are cached in computer memory 54 to be used for subsequent executions. Such caching allows for instructions that are reused in the guest binary to be executed without having to re-translate these instructions. This allows the guest binary to execute more efficiently with a significant improvement in execution time.

As set forth above, guest binary 50 includes encoded instructions 70 for implementing a mutex lock which must be translated. In a refinement of this translation, the mutex lock encoded instructions comprises translating the byte ordering from first computer architecture 60 to host computer architecture 50.

In a variation of the present embodiment, the mutex lock pointed by xlock→mp is shared among a number of processes according to the encoded instructions in the translated code. In this variation, the dynamic binary translator discovers the sharing in advance and creates the host mutex object, pointed by xlock→mt, to be shared among the same group of processes as well. By sharing xlock→mt, variety of complicated problems can be naturally avoided as otherwise if the mutex object pointed by xlock→mt is created as private data to each process, actions that pass xlock→mt directly to the host kernel syscalls to affect other processes will find their efforts end in vain since the non-shared object is unknown by all other processes.

In another refinement, the second mutex lock data structure (mt) is private to the guest executable binary while the first mutex (mp) lock data structure is shared among two or more processes. Having the private host mutex object pointed by xlock→mt is due to the fact that the spawning of new processes may occur well before the syscall gets detected by the translator. Specifically, at the time the translator discovers the mutex-related syscall and tries to map the mutex to a new xlock, other processes may have been running already. Therefore it is too late to create a shared object at this time. To overcome this obstacle, the xlock is allowed to stay as a process private data, meaning each process will have its own xlock. In this refinement, mp still points to the shared mutex. The timer-interrupted version of the host computer's syscalls is utilized so that running processes are not blocked forever. In this way, each thread, whether or not within the same process, is given the second chance to inspect xlock→mp to either acquire the lock or decide continue to block itself to wait for a period of time.

While embodiments of the invention have been illustrated and described, it is not intended that these embodiments illustrate and describe all possible forms of the invention. Rather, the words used in the specification are words fo description rather than limitation, and it is understood that various changes may be made without departing from the spirit and scope of the invention.

What is claimed is:

1. A method for executing non-native binaries on a host computer architecture, the method comprising:
   a) receiving a guest executable binary encoded on a non-transitory computer readable medium, the guest executable binary executable on a first computer architecture and including mutex lock encoded instructions for implementing a mutex lock;
   b) executing the guest executable binary on the host computer architecture by:
   translating the guest executable binary to a translated executable binary, such that the encoded instructions for implementing a mutex lock are translated by:
   mapping the mutex lock to an instance of a compound mutex lock data structure, the compound mutex lock data structure comprising:
   a pointer to a first mutex lock data structure;
   a pointer to a second mutex lock data structure, wherein the first mutex lock data structure interacts with the encoded instructions in a manner that simulates operation of a mutex lock on the first computer architecture; and the second mutex data structure is the mutex lock data structure native to the host computer architecture; and
   executing each instruction of the executable binary.

2. The method of claim 1 wherein translated instructions are cached in computer memory to be used for subsequent executions.

3. The method of claim 1 wherein translation of the mutex lock encoded instructions comprises translating byte ordering from the first computer architecture to the host computer architecture.

4. The method of claim 1 wherein the first mutex lock data structure is private to the guest executable binary.

5. The method of claim 1 wherein the second mutex lock data structure is shared among two or more processes.

6. The method of claim 1 wherein system calls of the first computer architecture are simulated.

7. The method of claim 6 wherein system calls of the first computer architecture are implemented by atomic operations of the host computer architecture.

8. The method of claim 1 wherein step b) comprises dynamic translation.

9. The method of claim 1 wherein step b) comprises mapping the registers of the first computer architecture to the host computer architecture.

10. The method of claim 8 wherein translation comprises receptively translating a small section of the guest binary.

11. A method for executing non-native binaries on a host computer architecture, the method comprising:
 a) receiving a guest executable binary encoded on a non-transitory computer readable medium, the guest executable binary executable on a first computer architecture and including mutex lock encoded instructions for implementing a mutex lock;
 b) executing the guest executable binary on the host computer architecture by:
 translating the guest executable binary to a translated executable binary, such that the encoded instructions for implementing a mutex lock are translated by:
 presenting a first mutex lock data structure that interacts with the encoded instructions in a manner that simulates operation of a mutex lock on the first computer architecture; and
 translating the first mutex lock data structure to an instance of a second mutex lock data structure, the second mutex data structure being native to the host computer architecture; and
 executing each instruction of the executable binary.

12. The method of claim 11 wherein translated instructions are cached in computer memory for subsequent executions.

13. The method of claim 11 wherein the first mutex lock data structure and the second mutex lock data structure are combined together into a combined mutex lock data structure.

14. The method of claim 11 wherein translation of the mutex lock encoded instructions comprises translating byte ordering from the first computer architecture to the host computer architecture.

15. The method of claim 1 wherein member methods of the first mutex lock data structure are translated into member methods of the second mutex lock data structure.

16. The method of claim 1 wherein the first mutex lock data structure is private to the guest executable binary and the second mutex lock data structure is shared among two or more processes.

17. The method of claim 1 wherein the second mutex lock data structure is shared among two or more processes.

18. A computer system for executing non-native binaries, the computer system comprising:
 a computer processor;
 a computer memory in communication with the computer processor; and
 a storage device in communication with the computer processor,
 the computer processor operable to:
 a) receive a guest executable binary encoded on a non-transitory computer readable medium, the guest executable binary executable on a first computer architecture and including mutex lock encoded instructions for implementing a mutex lock;
 b) execute the guest executable binary on the computer system by:
 translating the guest executable binary to a translated executable binary, such that the encoded instructions for implementing a mutex lock are translated by:
 mapping the mutex lock to an instance of a compound mutex lock data structure, the compound mutex lock data structure comprising:
 a pointer to a first mutex lock data structure;
 a pointer to a second mutex lock data structure, wherein the first mutex lock data structure interacts with the encoded instructions in a manner that simulates operation of a mutex lock on the first computer architecture; and the second mutex data structure is the mutex lock data structure native to the computer system; and
 executing each instruction of the executable binary.

19. The computer system of claim 18 further comprising computer memory onto which the non-native binary is encoded.

20. The computer system of claim 18 further comprising memory onto which code that translates the guest executable binary to a translated executable binary is encoded.

\* \* \* \* \*